United States Patent [19]
Brown, Jr.

[11] Patent Number: 6,098,335
[45] Date of Patent: Aug. 8, 2000

[54] PORTABLE GREENHOUSE

[75] Inventor: Burgess J. Brown, Jr., Eubank, Ky.

[73] Assignee: Stephens Pipe and Steel, Inc., Russell Springs, Ky.

[21] Appl. No.: 09/023,387

[22] Filed: Feb. 13, 1998

[51] Int. Cl.[7] .................................................. A01G 9/00
[52] U.S. Cl. ............................................................. 47/17
[58] Field of Search ...................... 47/17, 60, 29; 52/63, 64, 86; 135/98, 119, 124, 128, 136

[56] References Cited

U.S. PATENT DOCUMENTS

| | | |
|---|---|---|
| 2,869,561 | 1/1959 | Harkness . |
| 2,904,850 | 9/1959 | Couse et al. . |
| 3,165,110 | 1/1965 | Brooks . |
| 3,812,616 | 5/1974 | Koziol . |
| 3,961,442 | 6/1976 | Carter ........................................... 47/17 |
| 4,878,322 | 11/1989 | Ikeda et al. . |
| 5,479,744 | 1/1996 | Meyer . |
| 5,598,668 | 2/1997 | Isom ............................................ 52/86 |
| 5,660,002 | 8/1997 | Lashinger . |

*Primary Examiner*—Peter M. Poon
*Assistant Examiner*—Francis T. Palo
*Attorney, Agent, or Firm*—Stites & Harbison, PLLC; David W. Nagle, Jr.; Vance A. Smith

[57] ABSTRACT

The present invention is a portable greenhouse. When assembled, the greenhouse of the present invention comprises a frame constructed of tubular members over which a covering is fit. In its unassembled form, the greenhouse components may be packaged in a standard corrugated paper container, wherein selected components of the greenhouse form a rigid internal frame that provides strength and support to the container.

2 Claims, 7 Drawing Sheets

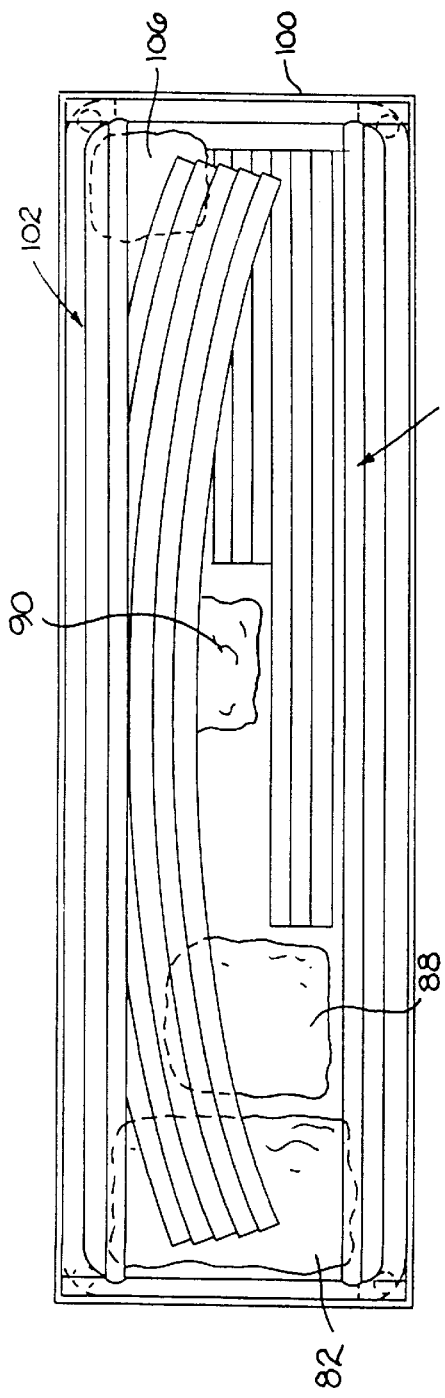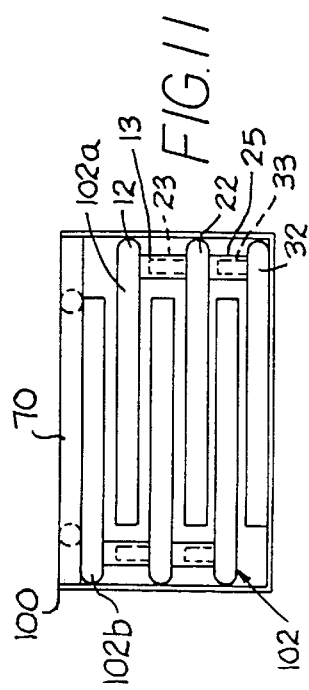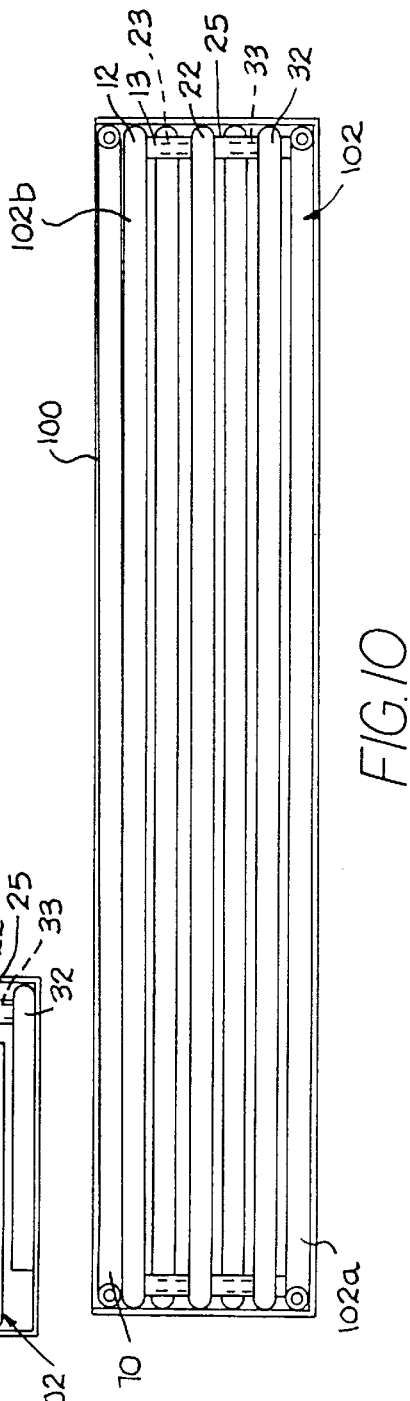
FIG.9
FIG.11
FIG.10

PORTABLE GREENHOUSE

BACKGROUND OF THE INVENTION

The present invention relates to a portable greenhouse, and, more particularly, to a portable greenhouse capable of being packaged in a compact, standard corrugated paper container for storage and display in a retail store.

Prefabricated greenhouses have existed in the marketplace for some time. Despite claims of portability, however, most prior art greenhouses have complex structures which require considerable and often complicated assembly. Moreover, few can be effectively packaged such that they may be placed on shelves of retail stores for display and ready access to the public. Also, because of their bulk, the packaging of prior art greenhouses often requires use of containers substantially stronger, and more expensive, than standard corrugated paper containers. The necessity of strong containers becomes even more apparent when a series of containers are stacked upon one another, as is often done on retail sales shelves.

It is thus an object of the present invention to provide a portable greenhouse that may be easily assembled.

It is a further object of the present invention to provide a portable greenhouse whose components may be packaged in a container suitable for display on retail store shelves.

SUMMARY OF THE INVENTION

The present invention is a portable greenhouse. When assembled, the greenhouse comprises a frame constructed of tubular members over which a polyethylene (or similar plastic) covering is fit. The frame of the greenhouse comprises a plurality of upper rails that have complementary securing fittings and form a first essentially rectangular configuration defining a first open space when fitted together, and a plurality of lower rails that have complementary securing fittings and form a second essentially rectangular configuration defining a second open space when fitted together. The first and second rectangular configurations are joined in a spaced apart arrangement by a plurality of upright members that have complementary fittings with the upper and lower rails. The first and second open spaces are filled by a door frame. Additionally, arched roof members extend from the front side to the rear side of the upper rails. A side cover, extending from the upper rails to the lower rails, circumscribes the outside of the rectangular configurations from one side of the door frame to the other, and is removably attached to the sides thereof. A roof cover also extends from said upper rails, enclosing the volume defined by the arched roof members.

In its unassembled form, the greenhouse components may be packaged in a standard corrugated paper container, wherein selected components of the greenhouse form a rigid internal frame that provides strength and support to the container.

BRIEF DESCRIPTION OF THE DRAWINGS

FIG. 9 is a top view of the greenhouse of FIG. 1, wherein the greenhouse is disassembled and packaged in a container such that selected components of the greenhouse form a rigid internal structure within said container;

FIG. 10 is a side view of the component packaging scheme of FIG. 9; and

FIG. 11 is an end view of the component packaging scheme of FIG. 9.

DESCRIPTION OF THE PREFERRED EMBODIMENT

Figure 1:
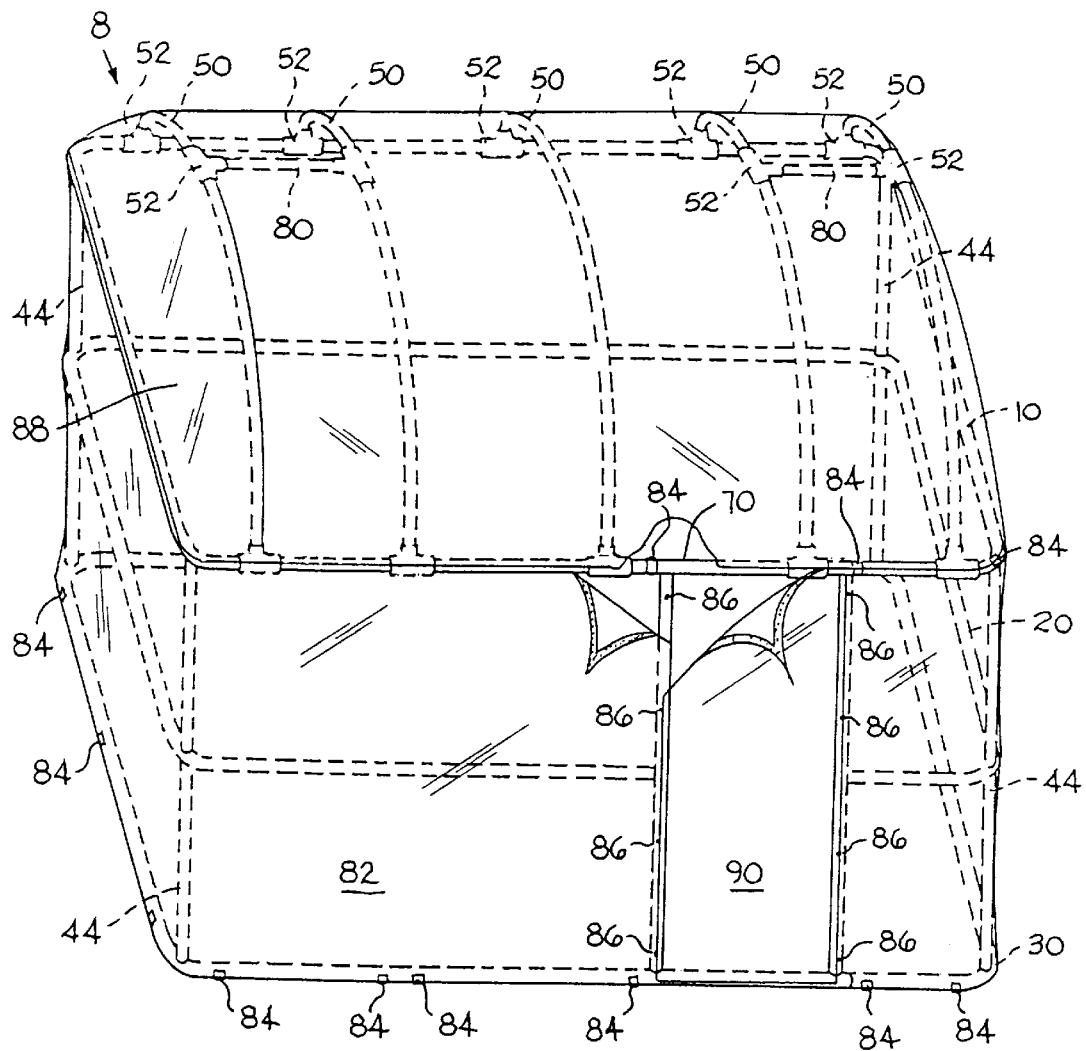
FIG. 1 is a perspective view of a greenhouse made in accordance with the present invention.

Referring to FIGS. 1–4, a greenhouse 8 in accordance with the present invention is preferably comprised of three sets of horizontal, tubular rails: upper rails 10, intermediate rails 20, and lower rails 30. When assembled, each set of rails defines an identical rectangular configuration. As best shown in the exploded perspective view of FIG. 2, the upper set of rails 10 includes a pair of "C-shaped" side rails 12, a back rail 14, and a front rail 16. For purposes of this description, the expression "C-shaped" is intended to describe a member having a long side extending between two right angle elbows integrally connected to a pair of shorter lengths of tubing with distal ends. The back rail 14 is provided with reduced diameter ends 14a that snugly or press fit within the inner diameter of the adjacent distal ends 12a, 12b of each of the C-shaped side rails 12. The front rail 16, being shorter than the back rail 14, is secured to one of the side rails 12, thereby forming a gap in the rectangular configuration defined by the upper set of rails 10.

Similarly, the intermediate set of rails 20 has a pair of C-shaped side rails 22, a back rail 24, and a front rail 26. The lower set of rails 30 also has a pair of C-shaped side rails 32, a back rail 34, and a front rail 36. As with the upper set of rails 10, the back rails 24, 34 of the intermediate and lower sets of rails 20, 30 have reduced diameter ends that snugly or press fit within the inner diameter of the distal ends of the respective C-shaped side rails 22, 32. While it is preferable that the ends of the rails have complimentary fittings allowing a proper and firm securing arrangement, other fastening means could also be used to secure the ends of the rails as long as the compact grouping of the components within a container is not sacrificed, as will be further discussed below.

Each elbow of the upper C-shaped side rails 12 is provided with a downwardly projecting annular boss 13. For reasons of packaging, as will be further described, the length of each boss 13 is slightly greater than the outer diameter of the various C-shaped rails. Additionally, each elbow of the intermediate C-shaped side rails 22 is provided with both an upwardly projecting annular boss 23 and a downwardly projecting annular boss 25. The downwardly projecting annular boss 25 has a length slightly greater than the outer diameter of the various C-shaped side rails. Finally, each elbow of the lower C-shaped side rails 32 is provided with an upwardly projecting annular boss 33. It is also important to note that the inner diameters of the downwardly projecting bosses 13, 25 are greater than the outer diameters of the upwardly projecting bosses 23, 33.

Figure 2:
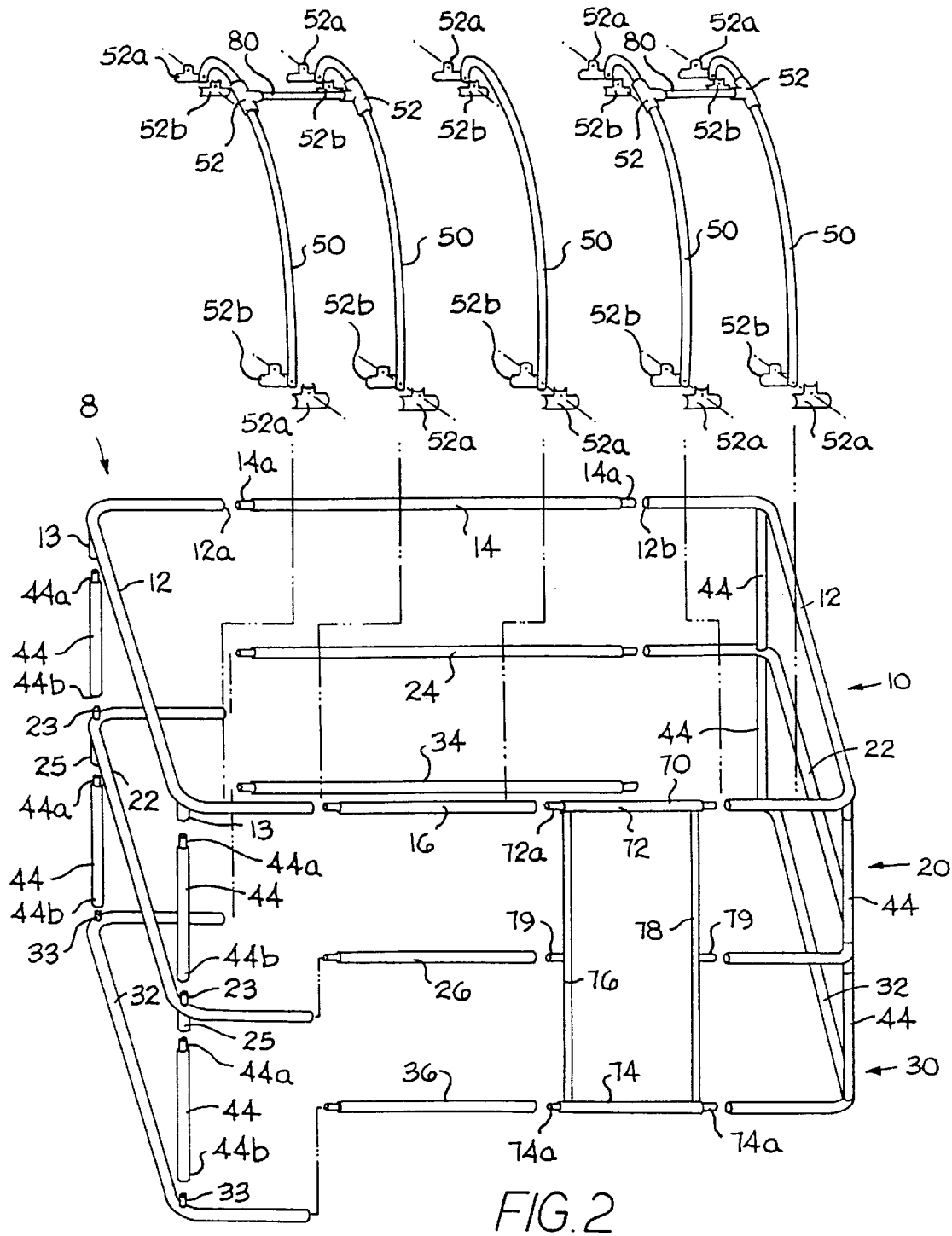
FIG. 2 is an exploded perspective view of the frame the greenhouse of FIG. 1.
Figure 3:
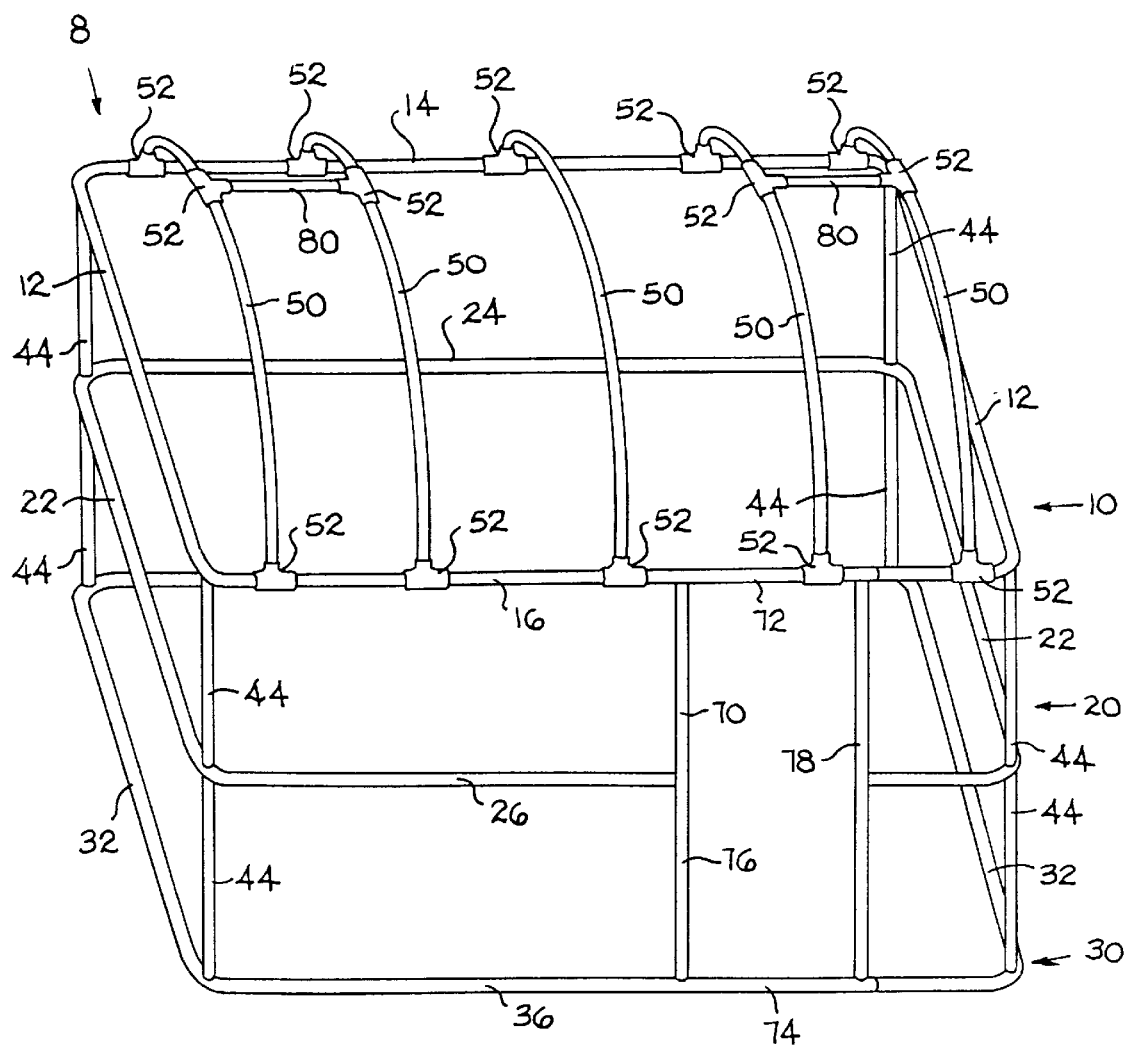
FIG. 3 is a perspective view of the assembled frame of the greenhouse of FIG. 1.

As also shown in FIG. 2, a plurality of upright tubular members 44 serve to space apart the upper, intermediate, and lower sets of rails 10, 20, 30 when the greenhouse 8 is assembled. Preferably, the upper distal ends 44a of the members 44 are provided with a reduced diameter and are adapted to be press fit within the inner diameters of the downwardly projecting bosses 13, 25 of the upper and intermediate rails, as described above. The other distal ends 44b of the upright members 44 fit over the upwardly projecting bosses 23, 33 of the intermediate and lower rails. This arrangement minimizes the collection of moisture within the various rails as all of the open ends of the upwardly projecting bosses and upright members are completely enclosed.

It is noted that the greenhouse of the present invention could be formed using only an upper and lower set of rails, forming two parallel spaced apart rectangular configurations. However, it is preferred that three levels of rails are used to enhance the structural integrity of the greenhouse.

The gaps formed within the rectangular configurations provide a space in which a pre-assembled door frame 70 may be installed. The door frame 70 is preferably comprised of upper and lower cross members 72, 74 integrally joined by a pair of spaced vertical members 76, 78. The upper cross member 72 has reduced diameter ends 72a which fit snugly within the inner diameter of the ends of the upper side rail 12 and upper front rail 16. Similarly, the lower cross member 74 has reduced diameter ends 74a which fit snugly within the inner diameter of the ends of the lower side rail 32 and lower front rail 36. Additionally, the vertical members 76, 78 are provided with horizontally extending protrusions 79 that fit within the inner diameter of the ends of the intermediate side rail 22 and intermediate front rail 26.

Figure 5:
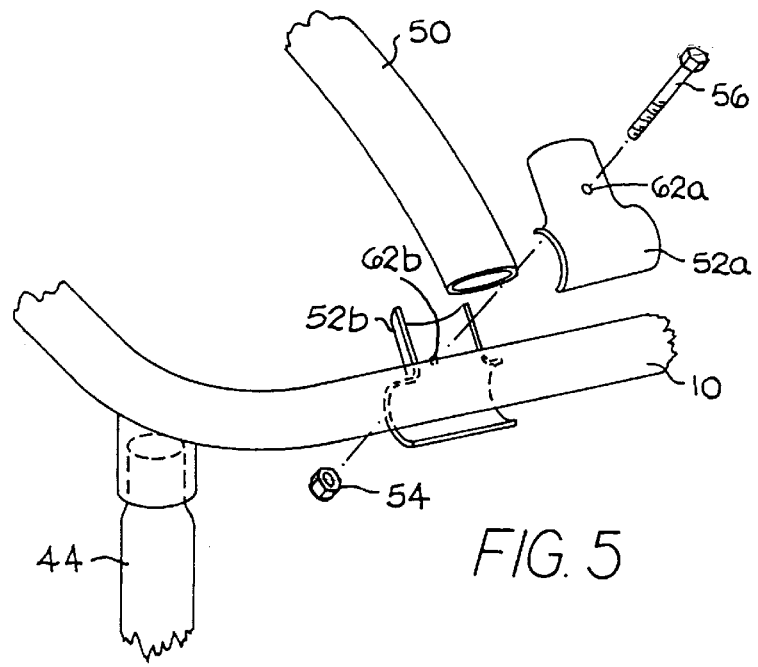
FIG. 5 is an exploded perspective view of an upper corner of the frame of FIG. 3, showing the use of a clamp to attach an arched roof member to an upper rail.
Figure 6:
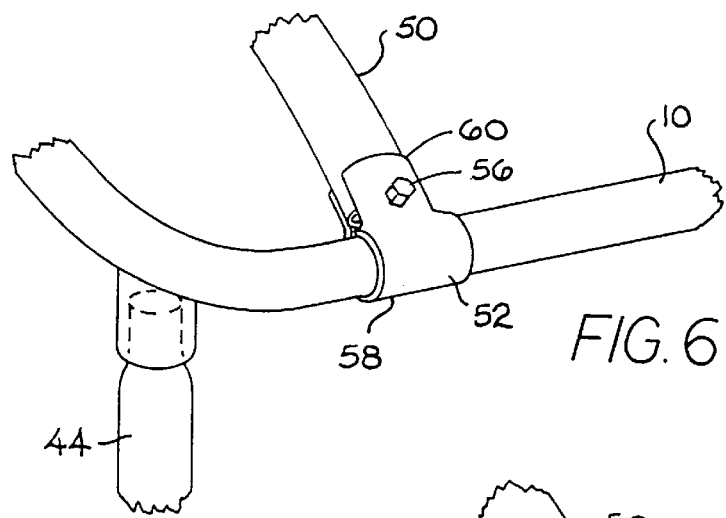
FIG. 6 is a perspective view of an upper corner of the frame of FIG. 3, showing the use of a clamp to attach an arched roof member to an upper rail.

The roof of the greenhouse 8 is formed by a series of arched roof members 50. In this preferred embodiment, there are five arched roof members 50, each of which extend from the front portion of the upper rails 10 to the rear portion of the upper rails 10. To attach an arched roof member 50 to the upper horizontal rails 10, a rail clamp 52 is used. As best shown in FIGS. 5–6, this rail clamp 52 is comprised of first and second portions, 52a and 52b, which are preferably secured together by a nut 54 and a threaded bolt 56. When assembled, the rail clamp 52 defines a lower cylindrical section 58 which encircles a portion of the upper rail 10. The assembled rail clamp 52 also defines an upper cylindrical section 60, with a central axis that is substantially perpendicular to that of the lower section 58, that encircles a portion of the arched roof member 50. In assembling the rail clamp 52, the first and second portions 52a, 52b are positioned around the upper rail portion 10 and the arched roof member 50. The bolt 56 is then fitted through holes 62a, 62b defined by said first and second portion 52a, 52b. The nut 54 is then threaded onto the bolt 56 and tightened, thereby drawing the two portions 52a, 52b of the rail clamp together, securing the arched roof member 50 and the upper rail 10 between the portions 52a, 52b. Two rail clamps 52 are used with each arched roof member 50, one to fasten the member 50 to the front portion of the upper rails 10, and one to fasten the roof member 50 the back portion of the upper rails 10.

Referring again to FIGS. 1–4, to provide further structural stability to the arched roof members 50, in this preferred embodiment, roof braces 80 are used to secure adjacent pairs of arched roof members 50 together. The roof brace 80 is simply a horizontal tubular member that is secured to adjacent arched roof members 50, at the peak of the roof, using a pair of rail clamps 52. As stated, in this preferred embodiment, there are five arched roof members 50, and so, two roof braces 80 are used to fasten either pair of outer arched roof members 50 together.

Figure 7:
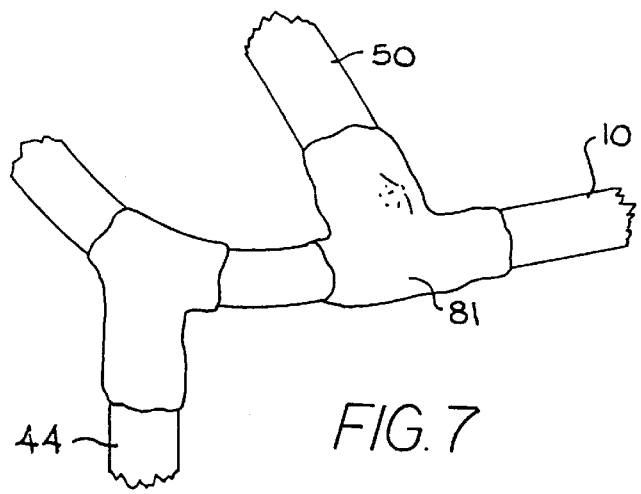
FIG. 7 is a perspective view of an upper corner of the frame of FIG. 3, wherein the joints have been covered by adhesive tape.

Before proceeding with securing the covers of the greenhouse 8 to the frame, it is preferred that all joints, especially the rail clamps 52, be wrapped in a sturdy tape 81 (e.g., duct tape) to protect the covers against tearing and abrasion, as shown in FIG. 7.

Figure 4:
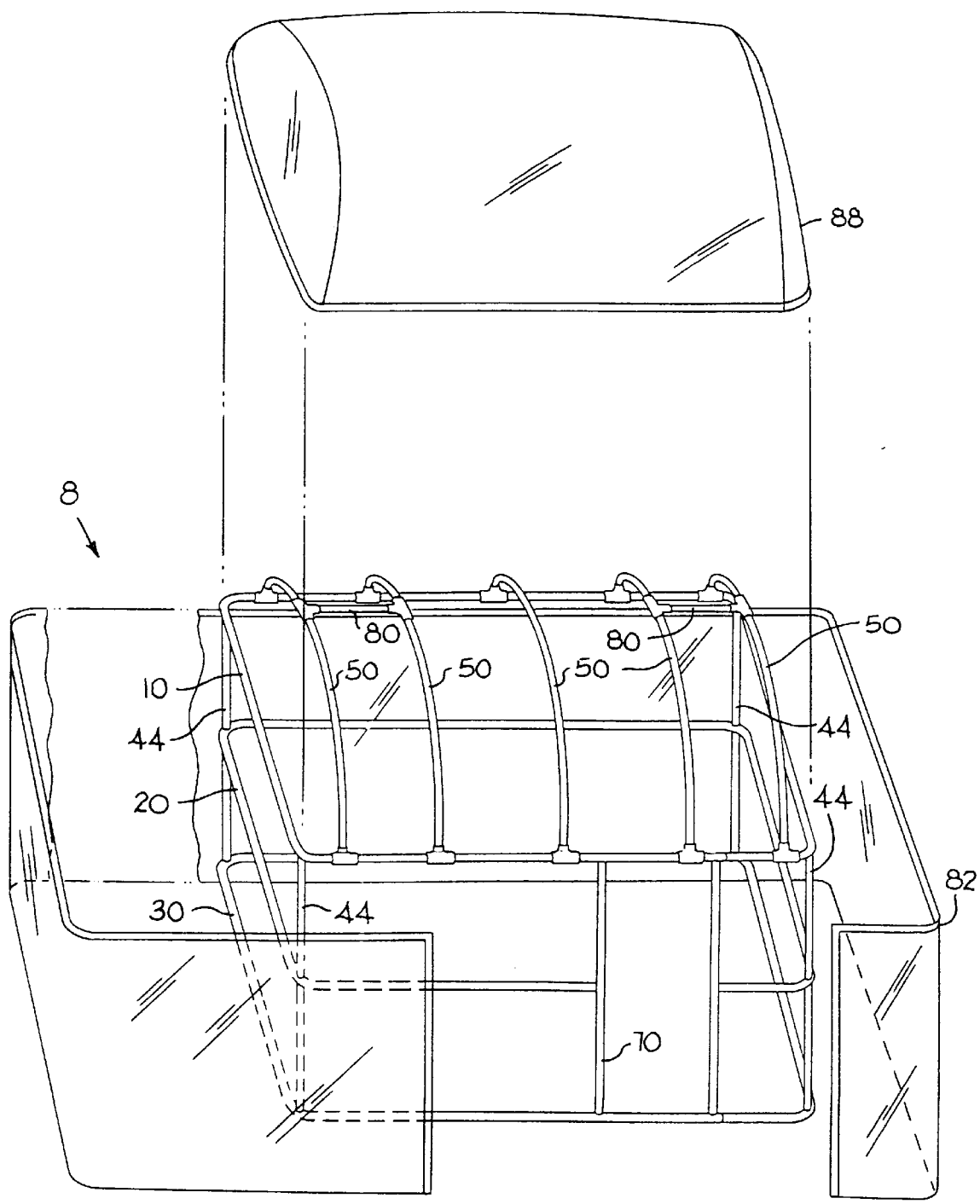
FIG. 4 is a perspective view of the assembled frame and the side and roof covers of the greenhouse of FIG. 1.

The side cover 82 is preferably made of a sturdy, polyethylene material. As shown in FIG. 4, the side cover 82 extends from the upper rails 10 to the lower rails 30 around the entire perimeter of the greenhouse 8, except for the door frame 70. A hook and loop fastening strip 83 (shown in FIG. 8) runs along the top and side edges of the cover 82.

Referring to FIG. 1, a preferred installation of the side cover 82 to the configuration discussed above proceeds as follows. First, the left edge of the side cover 82 is aligned with the right edge of the door frame 70. A clip 84 is then used to secure the top of the cover 82 to the upper rails 10. The clip 84 has a generally cylindrical configuration with a slot that allows it to be snapped onto the tubular rails, holding the side cover 82 securely against the rails. The side cover 82 is then stretched to the first corner of the frame where another clip 84 is used to secure the cover 82 to the upper rails 10. This process of stretching and clipping continues until the side cover 82 circumscribes the rectangular configuration and reaches the left side of the door frame 70. Returning to the right side of the door frame 70, the vertical member 78 defines a plurality of holes (not shown) along its length. A machine screw 86 (preferably including a washer) is pushed through the side cover 82 and through one of the holes. A nut (not shown) is then threaded on the screw 86, further securing the side cover 82 to the greenhouse frame. Similarly, on the left side of the door frame 70, the vertical member 76 defines holes (not shown) that receive machine screws 86 for securing the cover 82 to the frame in the same manner. In this preferred embodiment, four screws 86 are used along the right side of the door frame 70, and four screws 86 are used on the left side of the door frame 70.

After completing the attachment of the side cover 82, the roof cover 88 is attached. As shown in FIG. 4, the roof cover 88 is designed to extend from the upper rails 10 and completely enclose the volume defined by the arched roof members 50. A hook and loop fastening strip (not shown) extends around the perimeter of the roof cover 88 along its inside edge. The roof cover 88 is simply positioned over the roof members 50 and attached to the side cover 82 by mating the hook and loop fastening strip that runs along the interior edge of the roof cover 88 with the hook and loop fastening strip that runs along the top edge of the side cover 82. Although not indicated in the Figures, the roof cover 88 may also be provided with vent openings at either end of the roof cover 88 to provide for better control of air circulation and ventilation.

Once the roof cover 88 is attached, additional clips 84 are preferably used to secure the side cover 82 to the bottom rails, as indicated in FIG. 1.

Figure 8:
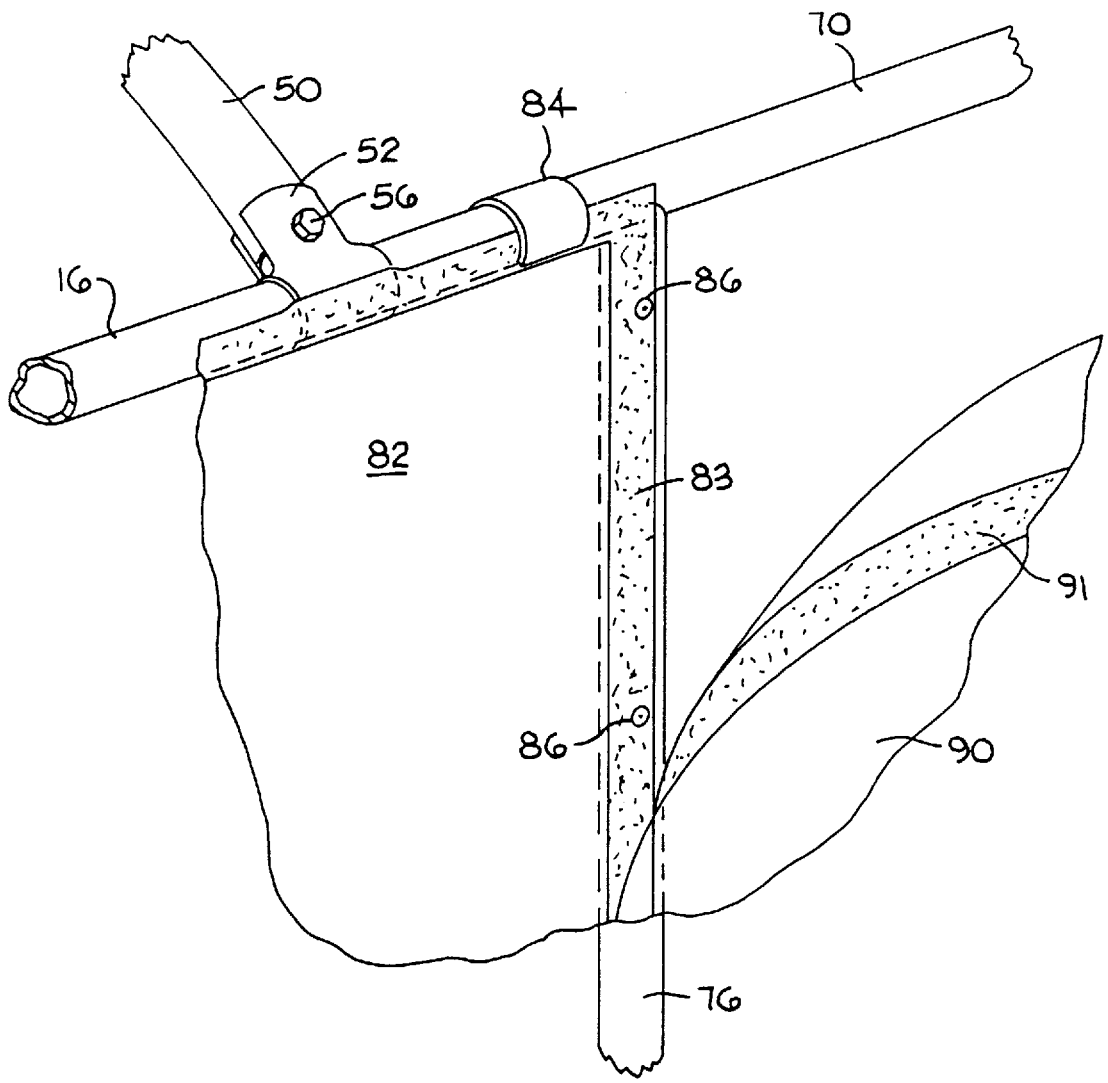
FIG. 8 is an enlarged perspective view of the greenhouse of FIG. 1, showing the attachment of the door to the side cover.

The door 90 is the last component to be installed. The door 90 is preferably constructed of a sturdy, polyethylene material. As shown in FIG. 8, the door 90 also has hook and loop fastening strips 91 along its side edges. In this manner, the door may be attached by mating the hook and loop fastening strips 91 on either side of the door 90 with the hook and loop fastening strips 83 along the edges of the side cover 82 on either side of the door frame 70. The top edge of the door 90 may be tucked between the upper rail 10 and the roof cover 88.

In this preferred embodiment, the side cover 82 and the roof cover 88 are somewhat oversized to facilitate installation. To remove the slack from the covers, the following adjustments may be performed. First, the arched roof members 50 may be adjusted so that only a small portion (approximately 1") of each member 50 is held by the upper cylindrical section 60 of the rail clamp 52. This effectively removes the slack from the roof cover 88. Secondly, the C-shaped side rails 12, 22, 32 may be tapped outward, expanding the length of the frame and removing the slack from the side cover 82.

Although not shown in the Figures, the greenhouse 8 may be equipped with four anchors (one in each corner) to secure the greenhouse to the ground. The anchors may be, for example, stakes tied to the lower side rails 32.

Referring now to FIGS. 9–11, prior to assembly, the components of the greenhouse 8 may be packaged and stored in a parallelepiped shaped container 100. The internal support frame, indicated generally be reference numeral 102, is formed by selected components of the greenhouse 8. As described above, it is important to note that the internal diameters of the downwardly projecting bosses 13, 25 are larger than the external diameters of upwardly projecting bosses 23, 33. Additionally, each of the downwardly projecting bosses 13, 25 has a length that is greater than the external diameter of the tubing comprising the rails.

In packaging the greenhouse 8, one of the lower C-shaped rails 32 is placed on the bottom of the container 100 with the long side of said rail 32 running parallel to and abutting the long side of the container 100, and with the bosses 33 extending upwardly. One of the intermediate side rails 22 is then positioned in the container 100 with the downwardly projecting bosses 25 in register with and covering the upwardly projecting bosses 33 of the lower rail 32. Then, one of the upper side rails 12 is similarly positioned with the downwardly projecting bosses 13 in register with and covering the upwardly projecting bosses 23. In this manner, a set 102*a* of spaced apart C-shaped side rails is positioned within the said container 100. Due to the length of the downwardly projecting bosses 13, 25, the spacing gap between the rails is slightly greater than the outer diameter of the rails. As stated, a first set 102*a* of side rails abuts a long wall of the container 100. A second set 102*b* is then similarly positioned on the opposite long wall of the container 100. The aforementioned spacing gap allows the short arms of the side rails to be interleaved, as best shown in FIG. 11, thereby making for a more compact arrangement. The short arms of the side rails thus provide support to the short walls of the container 100. And, because the spacing gap is only slightly larger than the diameter of the arms of the rails, sagging of one set of rails against the other is minimized.

The components of the greenhouse 8 thus form the internal support frame 102 of the packaging container 100. This frame 102 provides rigidity and resistance to pressure at the corners of the container 100. The remainder of the greenhouse components are positioned within this frame 102. As best shown in FIG. 9, the remaining rails (including the back rails, the front rails, the upright members, and the arched roof members), indicated generally by reference numeral 104, are all positioned between the C-shaped side rails that form the internal frame 102 of the container 100. The side cover 82, the roof cover 88, the door 90, and other hardware 106 (including rail clamps, clips, etc.) also are positioned within the frame 102. Finally, the door frame 70 rests on top of the frame 102, providing additional support to the side walls of the container 100.

Thus, the present invention provides an easily assembled, portable greenhouse whose components may be packaged in a simple container for storage and display.

It is understood that changes may be made in the construction and arrangement if the various components of the present invention without departing from the spirit or scope of the invention as defined in the following appended claims.

What is claimed is:

1. A portable greenhouse adapted to be assembled from a plurality of components, a portion of which cooperate to form a rigid internal structure for a container when said components are in packaged form and housed within said container, wherein said plurality of components comprises:
(a) a plurality of upper rails having first complementary securing fittings for forming an essentially first rectangular configuration having a front side and a rear side, and defining a first gap when said upper rails are fitted together;
(b) a plurality of lower rails having second complementary securing fittings for forming an essentially second rectangular configuration, and defining a second gap when said lower rails are fitted together;
(c) a plurality of upright members having a plurality of first coupling members adapted to couple with a plurality of respective second coupling members on said upper and lower rails to secure said first and second rectangular configurations in a spaced apart relationship in which said first gap is immediately above said second gap;
(d) a door frame adapted to be positioned within said first and second gaps when said rectangular configurations are assembled;
(e) a plurality of arched members which extend from the front side to the rear side of said first rectangular configuration;
(f) a side cover capable of being folded for positioning in said container, wherein, when unfolded, said side cover extends from said upper rails to said lower rails along the perimeter of said first and second rectangular configurations;
(g) a roof cover capable of being folded for positioning in said container, wherein, when unfolded, said roof cover extends from said upper rails and fits over said arched members;
(h) a door capable of being folded for positioning in said container, wherein, when unfolded, said door is removably attached to said greenhouse, thereby covering said door frame; and
(i) fasteners for securing said side and roof covers to said first and second rectangular configurations; and
wherein said portion of components forming the rigid internal structure within said container comprises:
(a) a first and second set of selected upper and lower rails, each of said selected rails having a long extension bending at an elbow at the ends thereof with an arm extending from each elbow and terminating at a distal end;
(b) said first set of selected upper and lower rails abutting one side of said container along substantially the entire length of each of said long extensions thereof and held in a spaced apart relationship from one another by said second coupling members, said arms of said first set of selected rails abutting sides of said container adjacent said one side;

(c) said second set of selected upper and lower rails abutting a side of said container opposite said one side along substantially the entire length of each of said long extensions thereof and held in a spaced apart relationship from one another by said second coupling members, said arms of said second set abutting said adjacent sides of said container, and overlapping and being interleaved with said arms of said first set; and (d) the remainder of components being positioned between said first and second sets of selected rails and maintaining said sets in a spaced apart relationship from one another within said container.

2. The greenhouse of claim 1, and further comprising a plurality of intermediate rails for forming a third essentially rectangular configuration positioned by said upright members between said first and second configurations.

* * * * *